United States Patent [19]

Morency

[11] Patent Number: 4,798,717
[45] Date of Patent: Jan. 17, 1989

[54] PRODUCTION OF ELEMENTS AND COMPOUNDS BY DESERPENTINIZATION OF ULTRAMAFIC ROCK

[75] Inventor: Maurice Morency, St-Lambert, Canada

[73] Assignee: Ultramafic Technology Inc., Kansas City, Mich.

[21] Appl. No.: 35,620

[22] Filed: Apr. 13, 1987

Related U.S. Application Data

[63] Continuation-in-part of Ser. No. 886,696, Jul. 25, 1986, abandoned, which is a continuation-in-part of Ser. No. 775,283, Sep. 12, 1985, abandoned.

[51] Int. Cl.$^4$ .............................................. C01B 3/02
[52] U.S. Cl. ............................ 423/648.1; 423/167; 423/331; 423/335; 75/2; 75/21; 208/133; 208/137
[58] Field of Search ............... 423/155, 158, 163, 167, 423/168, 150, 324, 331, 335, 648 R; 208/133, 134, 135, 136, 137, 138; 75/2, 101 R, 21

[56] References Cited

U.S. PATENT DOCUMENTS

| | | | |
|---|---|---|---|
| 16,960 | 3/1912 | Thomson-Houston | 423/167 |
| 1,031,498 | 7/1912 | Witney | 423/167 |
| 1,109,448 | 9/1914 | Messerschmitt | 423/657 |
| 3,215,494 | 11/1965 | Hemstock | 423/167 |
| 3,514,256 | 5/1970 | Berry | 423/657 |
| 3,954,943 | 5/1976 | Newmann et al. | 423/158 |
| 4,180,433 | 12/1979 | Glass et al. | 423/331 |
| 4,192,707 | 3/1980 | Glass et al. | 423/331 |
| 4,259,146 | 3/1981 | Glass et al. | 423/331 |

FOREIGN PATENT DOCUMENTS

87/01731 3/1987 World Int. Prop. O. .......... 423/167

OTHER PUBLICATIONS

Chemical Abstracts, vol. 96, 1982, p. 226, abstract No. 166238r.
Chemical Abstracts, vol. 89, 1978, p. 463, abstract No. 204834x.
Chemical Abstracts. vol. 87, 1977, p. 163, abstract No. 42072b.
Chemical Abstracts, vol. 72, 1970, p. 118, abstract No. 5071v.

Primary Examiner—Robert L. Stoll
Attorney, Agent, or Firm—Pennie & Edmonds

[57] ABSTRACT

Ultramafic rock material containing, or which is serpentinized so as to contain, substantially or completely serpentinized material, or alternatively, clay material containing structural water, is subjected to a temperature and pressure for a period of time and optionally in the presence of added elemental or ferrous iron to cause deserpentinization or dehydroxylation and consequent formation of hydrogen and hydrocarbons and formation of a solid residue having a mineral content containing one or more of magnesium, nickel, iron, magnetite, calcium or other metal values. When the material is deserpentinized or dehydroxylated in the vicinity of 700° C. or subsequently heated at between about 700° and 815° C., the mineral content of the residue has a transition lattice structure whereby the magnesium, nickel, calcium and other mineral values can be extracted by trituration with mineral acid, e.g., hydrochloric acid, to form an aqueous solution of the mineral acid salts of such metal values. The solid residue can be utilized to produce other materials of economic value such as amorphous silica, which are substantially free of iron oxide coloration.

30 Claims, 3 Drawing Sheets

PRODUCTION OF ELEMENTS AND COMPOUNDS BY DESERPENTINIZATION OF ULTRAMAFIC ROCK

This application is a continuation-in-part of application Ser. No. 886,696 filed July 25, 1986, now abandoned, which in turn is a continuation-in-part of application Ser. No. 775,283, filed Sept. 12, 1985, abandoned.

DESCRIPTION

1. Technical Field

This invention relates to the production of elements and compounds by deserpentinization of ultramafic rock or certain clay materials. In particular, it relates to the production of gaseous hydrogen and hydrocarbons as well as solid by-products containing magnesium, nickel, and other metal values from ultramafic rock (e.g., asbestos mine tailings) or clay material containing structural water.

2. Background Art

For decades, the mining of asbestos has been carried out on a vast scale in a number of countries including Canada and the United States. In the Thetford Mine area of Quebec Province alone, asbestos mining has resulted in huge quantities of asbestos mine tailings being deposited, often at an annual rate exceeding 30 million tons. These deposits, which appear like barren mountains on a blighted landscape, are a menace to public safety in that they contain residual asbestos (chrysotile) in quantities sufficient to be of concern to health officials because of the tailings' dustiness in dry weather. Environmentally, these man-made mountains are an eyesore and of no real estate value because of the material's resistance to chemical weathering and inability to support plant life. And heretofore, there has been no cost-effective way of dealing with this enormous ecological and health problem.

Occurrences of trapped gases in igneous rocks have been reported by Votov et al., *Dokl. Akad. Nauk SSSR*, 213, 198–201 (1973), Agafovnov et al., *Dokl. Akad. Nauk SSSR*, 210, 232–4 (1972) and Petersil'ye et al. (1980). The main constituent of such gases was hydrogen, together with small amounts of hydrocarbons, nitrogen and carbon dioxide. According to the aforementioned authors, the gases were trapped in closed pores of the rock following crystallization and are believed to have originated with outgassing processes from sources within the earth's mantle. In addition, a depth relationship is indicated where hydrogen is the essential gas constituent at depths greater than 70 km while mixtures of hydrogen and hydrocarbons are associated with shallower depths in the region of the upper mantle. Other reports of hydrogen and gas mixtures outgassing at the earth's surface have been reported by Sugisaki, *J. Geol.*, 91, 239–58 (1983) (earthquake outgassing); Oskarsson, *J. Volca. Res.*, 22, 97–121 (1984) (fumaroles associated with rifting) and Gold, *EOS (Am. Geophys. Union, Trans.)*, 59(4), 810 (1978) and *J. Pet. Geol.* 1(3), 3–19 (1979) (volcanic activities).

Recently, major emanations of hydrogen and other gases in association with highly alkaline spring waters of the calcium hydroxide type occurring along fault and shear discontinuities in partly to wholly serpentinized ultramafic environments from mantle source rocks in Oman have been reported by Neal et al., *Earth and Plan. Sci. Let.*, 66, 315–20 (1983) and from oil wells in Kansas by Goebel et al., *Oil & Gas J.*, 7, 215–22 (1984) and Angino et al., *Oil & Gas J.*, 7, 142–6 (1984). The origin of the gaseous emanations in Oman is ascribed to shearing and post-serpentinization chemical degradation of ultramafic rocks. The Kansas occurrences are attribued to three possible inorganic processes, namely, outgassing of the mantle, shearing, and serpentinization of an ultramafic mass. It is interesting to note that the Kansas occurrences are located above the North American Continental Rift where basaltic and ultramafic rocks have been postulated.

As used herein, the terms "ultramafic rock," "serpentinization" and "deserpentinization" have the following meanings. Ultramafic rocks are those rocks containing less than 45% $SiO_2$ and composed largely of olivine, pyroxene, serpentine, and opaque minerals and which can be monomineralic. Serpentinization is the process of converting olivine or pyroxene, by hydration, to the mineral serpentine. The conversion causes the formation of a phyllosilicate from either orthosilcates or inosilicates. Deserpentinization is the reverse of the serpentinization reaction and involves the conversion of phyllosilicates to orthosilicates. In all cases, deserpentinization involves dehydroxylation processes.

A characteristic common to most of the gas occurrences described above is their association with ultramafic rocks. In addition, it is known that carbon in the form of graphite and carbonates is associated with ultramafic rocks of differing origins, i.e., kimberlites ophiolites and komatiites. Pasteris, *Geology*, 9, 356–9 (1981); Hock, *Ofiolite*, 5, 57–64 (1980); Smith, in Boyd & Meyer, ed., *2d International Kimberlite Conference Proc. Washington American Geophys Union*, 2 345–56 (1979). The carbonates are viewed as being secondary from hydrothermal solutions which are, in most cases, post-serpentinization. I have recognized and confirmed that deserpentinization can cause the release of hydrogen, hydrocarbons and carbon dioxide.

There are two opposing theories regarding the origin of petroleum. One theory favors an organic origin and the other an inorganic origin. In North America the organic theory has prevailed for the past century and is generally accepted while, for example, Russian theorists currently favor an outgassing process for the origin of petroleum. According to results which I have obtained, at least some petroleum and natural gas deposits appear to be derived from inorganic processes within the earth. Accordingly, deserpentinization and the simultaneous dissociation of carbonate minerals with proper catalysts in ultramafic rocks is a possible mechanism for the generation of hydrogen and hydrocarbons within the earth's crust.

Fresh ultramafic rocks are composed essentially of the mineral olivine, $(Fe,Mg)_2SiO_4$; orthopyroxene, $(Fe,Mg)SiO_3$; and clinopyroxene, $(Ca,Fe,Mg)_8(SiO_3)_2$ in various proportions. It is important to note that in all of the above minerals iron is in the ferrous state.

After their formation, the original mineral assemblage may be serpentinized (hydrated) in the presence of water and thereby converted to serpentine minerals, the most common of which are lizardite; chrysotile, $(Mg,Fe)_3Si_2O_5(OH)_4$; brucite, $(Mg,Fe)_8(OH)_2$; magnetite, $Fe_3O_4$; and minor amounts of awaruite, $(Fe,Ni)$. Serpentinization alters the structure of the original minerals by converting them into phyllosilicates having a clay-like structure and containing as much as 14–15 weight % structural (i.e., chemically bound) water. In these minerals, ferrous iron of the primary olivine and pyroxenes has been redistributed in brucite, lizardite, chrysotile and a small fraction of the iron is converted to ferric iron in magnetite.

According to Moody, *Ph.D. dissertation* (McGill University, 1974) and Moody, *Lithos,* 9, 125-38 (1976), the serpentinization process can be represented by the following general equation:

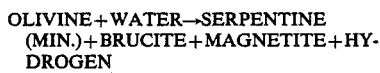
OLIVINE+WATER→SERPENTINE (MIN.)+BRUCITE+MAGNETITE+HYDROGEN or more precisely:

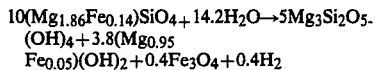
$10(Mg_{1.86}Fe_{0.14})SiO_4 + 14.2H_2O \rightarrow 5Mg_3Si_2O_5(OH)_4 + 3.8(Mg_{0.95}Fe_{0.05})(OH)_2 + 0.4Fe_3O_4 + 0.4H_2$ Although the temperature and pressure conditions under which the reaction occurs in nature are still questionable, Moody, supra, in laboratory experiments bracketed the reaction at 335° C.±/5° C. at a pressure of 0.5 bar. On the other hand, O'Neil et al., *J. Geophy. Res.,* 85 (B11), 6286-92 (1980) and Gregory (1981) suggest a serpentinization temperature of approximately 125° C. or less, based on data from hydrogen isotope studies.

Serpentinization is a common occurrence in nature, and most ultramafic rocks are affected, to a greater or lesser degree. Thus, Gilbert, *Masters Thesis* (University of Quebec at Montreal, 1981), Trottier, *Masters Thesis* (University of Quebec at Montreal, 1982) and Tremblay, *Masters Thesis* (University of Quebec at Montreal, 1985) report that ophiolites with a thickness of as much as 5 to 8 km commonly display a pervasive serpentinization ranging from a few percent to complete serpentinization.

The serpentinization process represented by the equation above is reversible in the laboratory and also occurs in nature. See Moody (1974), supra; Springer, *J. Petro.,* 15 (Part 1), 160-95 (1974); Frost, *J. Petro.,* 16 (Part 2), 272-313 (1975); and Vance, *Geol. Soc. Am. Bull.,* 88, 1497-1508 (1977). In the reverse reaction, the hydroxyl group (OH) or the structural water in the brucite and serpentine minerals is expelled at temperatures between 250≈ to 700° C. This phenomenon corresponds to the endothermic peaks on the differential thermal analyses curve (DTA) and also to the weight loss on the thermal gravimetric analysis (TGA) curve as shown in FIG. 1 for harzburgite. This superheated (structural) water reacts with ferrous iron from the serpentine minerals and brucite yielding hydrogen and magnetite. For instance, a possible reaction is:

$3Fe(OH)_2 \rightarrow Fe_3O_4 + 2H_2O + H_2$

BRUCITE→MAGNETITE+WATER+HYROGEN.

I have discovered that the complete reverse reaction can be represented by the following:

SERPENTINE+BRUCITE→OLIVINE+MAGNETITE+WATER+HYDROGEN.

The conversion back to a magnesium-enriched olivine, Fo94-Fo96 (i.e., olivine in which forsterite ("Fo") constitutes from 94 to 96% by weight and fayalite correspondingly constitutes from 6 to 4%) is associated with the exothermic peak at 815° C. on the DTA curve in FIG. 1 (TGA reference measurement (in mg); DTA measurements (in microvolts) based on aluminum oxide or an empty platinum crucible reference). Natural occurrences of deserpentinized ultramafic masses have been described by Dungen, *Ph.D. dissertation* (Univ. Washington, 1974), Springer, supra, Frost, supra, and Vance et al., *supra.* Vance et al., *supra,* proposes a deserpentinization process for the origin of some large ultramafic masses in the Cascade Mountains of Washington occurring prior to the emplacement of the body into its present structural position.

Ultramafic rocks such as ophiolite or komatiites often have carbonates associated with them. In some cases, this association has resulted in deposits of economic importance in the form of magnesite and talc. See Chichester, *U.S.G.S. Prof. Papers,* 345, 207 (1962); Griffis, *Econ. Geol.,* 67, 63-71 (1972); and Dordevic, *Geol. Glasnik, Sarojeva,* 17, 169-79 (1973). In other instances, the carbonate minerals, dolomite or/and magnesite are disseminated or are found as small veinlets in the ultramafic body. See Vakanjac, et al., in Panayiotov, ed., *Ophiolite Symp. Cyprus. Geol. Surv.* 722-6 (1980); Gilbert, *supra;* and Harnois, *Masters Thesis* (University of Quebec at Montreal, 1982).

The carbonate minerals will partly or completely dissociate producing carbon dioxide and carbon monoxide in the process of deserpentinization at the temperatures which are required:

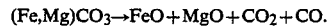
$(Fe,Mg)CO_3 \rightarrow FeO + MgO + CO_2 + CO.$

Carbon dioxide can react with the nascent hydrogen at high temperature in the presence of a proper catalyst such as chromium to produce methane:

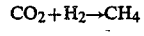
$CO_2 + H_2 \rightarrow CH_4$

More complex hydrocarbons, e.g., benzene, can be generated through catalytic hydrogenation. The catalysts required for the reaction are disseminated in situ in the rocks, and can include nickel, chromium, cobalt and small quantities of the noble metals.

Among the vast quantities of ultramafic materials distributed widely throughout the world, tailings deposited in asbestos mining operations and so-called "float" (dust-like particles which include asbestos fibers of extremely short, unclassifiable length produced during the asbestos milling operation) constitute, as noted earlier, a glaring example, from the standpoint of their resistance to chemical weathering and their notoriously deleterious effect on the environment and public health and safety. This fact, coupled with the existence of mountains of asbestos tailings in areas readily accesible to means of transportation and proximity to sources of heat and electric power has created a need as well as an opportunity to deal with such deposits in an economical way.

Accordingly, it is an object of the present invention to provide a method for deriving products of economic value from ultramafic rock and related materials, including asbestos tailings.

Another object is to provide a method for utilizing ultramafic rock and related materials, including asbestos mine tailings, as sources of gaseous hydrogen, hydrocarbons, and useful solid by-products.

These and other objects of the invention as well as a fuller understanding of the advantages thereof can be had by reference to the following description and claims.

SUMMARY OF THE INVENTION

The foregoing objects are achieved according to the present invention by a process utilizing ultramafic rock material which initially can be unserpentinized, partly serpentinized or entirely serpentinized. If the ultramafic rock contains a substantial unserpentinized fraction (as indicated by the fact that it contains less than about 9 weight percent structural water (i.e., hydroxyl which is chemically bound mainly to Mg, and also to Al, Fe, etc.) as can be determined by differential thermal analysis, thermogravimetric analysis or the polarizing microscope) or if it is entirely unserpentinized, then it is first contacted with water at a temperature and pressure for a period of time to form an ultramafic rock which is essentially completely serpentinized with concomitant production of hydrogen. The ultramafic material, which was either substantially or entirely serpentinized to begin with (as indicated by the fact that it contained from about 9 to about 15 percent by weight structural water), e.g., the asbestos "float" described hereinabove, or was subjected to serpentinization in the manner aforesaid, is subjected to deserpentinization at conditions of temperature, pressure and time to produce hydrogen and hydrocarbons (generally $C_1$ to $C_5$ saturated and $C_2$ and higher unsaturated hydrocarbons) together with a solid residue of mineral by-products containing magnesium, nickel, chromium, silicon (amorphous or crystalline silica), calcium and other values including noble metals in some cases. The materials subjected to deserpentinization should be as finely divided as possible.

The present invention can also be carried out using, as starting material, clay (i.e., hydrous aluminium silicate and other minerals) containing structural water and ferrous iron which is often found in glacial clay, and subjecting such clay to the conditions herein specified for ultramafic rock material.

Preferably, the serpentinization step is conducted at a temperature of between about 300° and about 350° C., at a pressure of between about 0.3 and 0.7 bar. The deserpentinization step is preferably conducted at a temperature of between about 200° (especially when the rock material is high in brucite) and about 700° C. (especially when the material is high in antigorite) at atmospheric pressure (i.e., about 1 bar) for a period of time which can vary widely depending on the other process conditions, but which in most cases will be between about 20 and about 45 minutes. Less desirable (albeit still generally operable) results are obtained at the extremes of the temperature range when the structural water and/or iron contents of the material are low. Most preferred from the standpoint of optimal hydrogen and hydrocarbon formation is a deserpentinization temperature of between about 300° and about 650° C. Optionally, iron in either the zero (iron powder, $Fe^0$) or $+2(Fe^{+2})$ valence state is advantageously added as an adjuvant to the deserpentinization reaction to supplement the iron already contained in the material to enhance the production of hydrogen and hydrocarbons. Other adjuvants, or "boosters", preferably in the powdered state (the finer the better), that can be used are metallic zinc, wood charcoal and petroleum coke. A particularly preferred adjuvant is iron-containing powder in an amount up to about 30% by weight and having the following composition: 4% $SiO_2$, 1.5% C., 2% basic oxide (e.g., Mg, Ca)O, 83% Fe, 10% FeO and traces of chromium, nickel and copper, and of a mesh size that peaks between 270 and 325 mesh, with an second peak at minus 400 mesh.

It is a feature of the present invention that when a portion of the hydrogen generated in the serpentinization step and/or a portion of the hydrogen generated in the deserpentinization step are fed, together with calcium carbonate or an equivalent source of carbon, to the deserpentinization reaction mixture, the formation of hydrocarbons is enhanced. This feature is augmented by the co-addition of one or more catalysts for the formation of hydrocarbons which are selected from the group consisting of metallic cobalt, chromium, nickel, zinc, copper and noble metals. These catalysts are administered preferably in powdered form in amounts which effectively increase the hydrocarbon yield (e.g., up to about 30% by weight of the sample).

Another feature of the invention is the discovery that when the deserpentinization is carried out at about 700° C., which is the desired upper temperature limit of the reaction, or when the solid residue obtained following the deserpentinization is heated to between about 700° and less than 815° C. (e.g., up to about 810° C.), the generated minerals assume a transition lattice structure (see FIG. 1). Such a structure is characterized by a metastable, developing crystal lattice which is in a state of transition between an initial, stable, crystal (phyllosilicate) form and a final, stable, crystal (orthosilicate) form. The fact that a transition lattice structure can be imparted to the minerals in the solid residue according to the present invention is significant because magnesium and nickel-containing minerals having such a transition lattice structure have greater susceptibility to dissolution by aqueous mineral acids of widely varying concentration. As a consequence, since the solid residue can thus be readily dissolved, for example, in hydrochloric acid, preferably 1–12M HCl at ambient temperature, or after slight heating to 29°–35° C., the resulting aqueous solution of magnesium, calcium, nickel chloride, silicon, and chromium can be treated by well-known, readily available techniques to win such metal values. By carrying out the deserpentinization within the preferred temperature range of 300°–650° C., and then heating the solid residue to between about 700° and less than 815° C. in a separate step, the advantageous transition lattice structure can be imparted to the minerals in the residue without compromising the optimalization of the hydrogen and hydrocarbon production. Alternatively, the solid residue can be treated with ammonium sulfate to produce magnesium sulfate under the process conditions described in U.S. Pat. No. 4,277,449 which is incorporated herein by reference; or by treatment with sulfur dioxide to produce magnesium hydroxide or carbonate in the manner described in U.S. Pat. No. 4,124,683 which is incorporated herein by reference. Magnesium sulfate is useful, for example, in making fertilizers as taught in Canadian Patent No. 1,178,818 incorporated herein by reference. The solid residue from the deserpentinization can also be utilized for making materials of economic value, e.g., having refractory and heat storage capabilities as described in U.S. Pat. No. 4,287,167 and U.S. Pat. No. 4,322,022 incorporated herein by reference.

DESCRIPTION OF PREFERRED EMBODIMENTS

EXAMPLE 1

Figure 1:
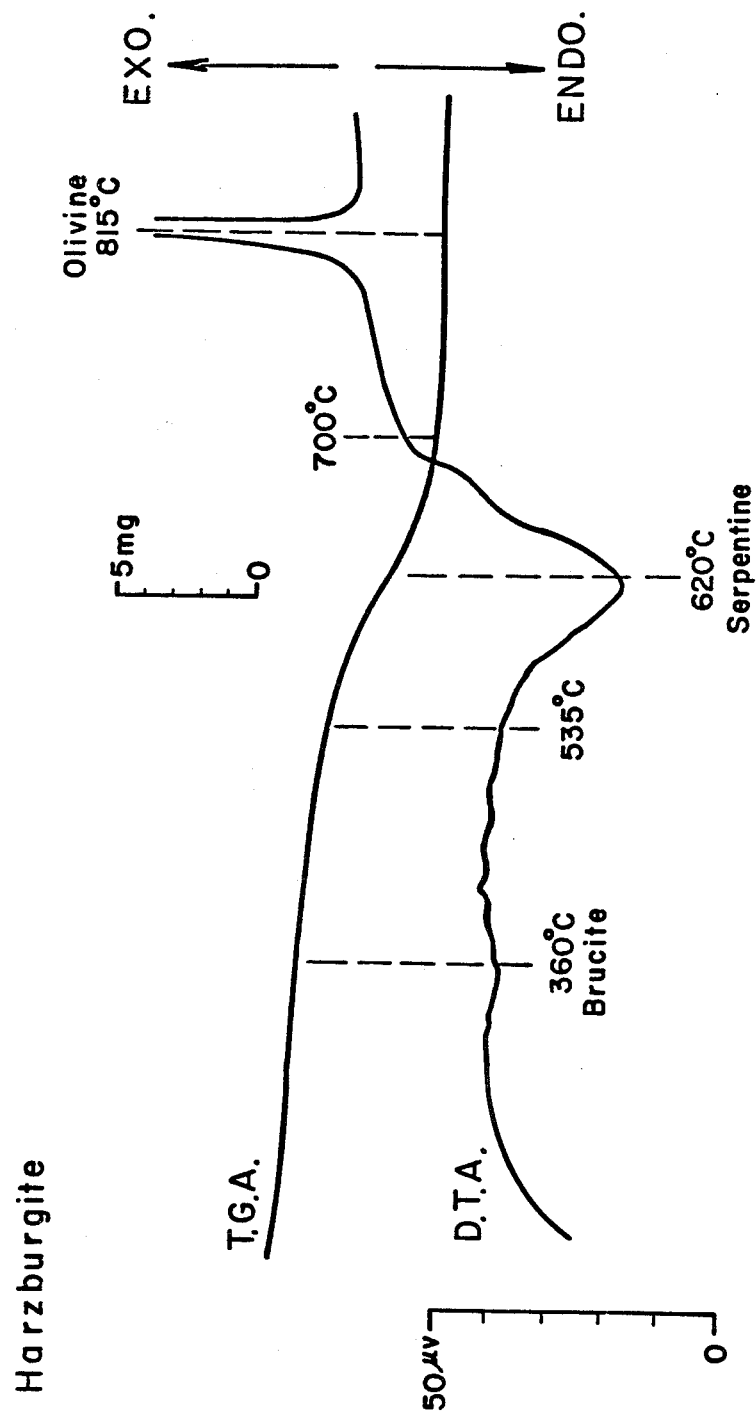
FIG. 1 is a graphic representation of the thermal properties of one form of ultramafic rock, as described hereinabove.
Figure 2:
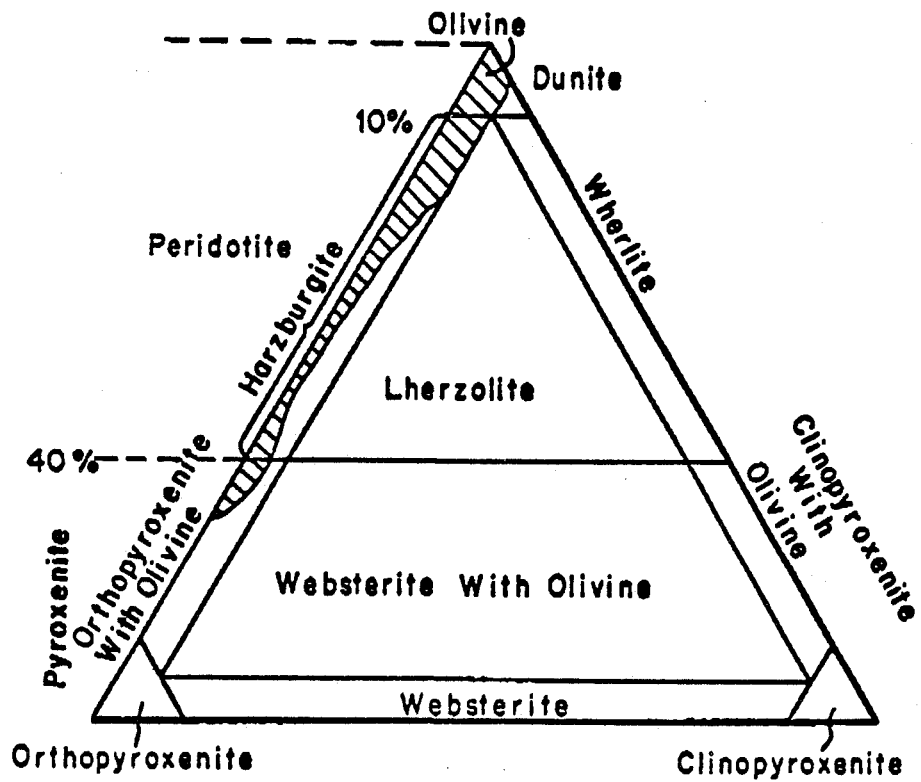
FIG. 2 is a diagrammatic representation of the typical compositions of ultramafic rock material.

Ultramafic rock samples from two ophiolite complexes of the Quebec Appalachian ophiolite belt, namely, Mount Albert in the Gaspe Penninsula and Thetford Mines, the latter being well-known for asbestos production, and whose bulk mineral compositions are shown in FIG. 2 were used as starting materials. Also, a sample of a precambrian komatiite flow from Val d'Or, Quebec was used. The petrography and modal evaluation of the materials used in quantitative gas measurements are summarized below in Table 1.

TABLE 1

| SAMPLE | IDENTITY | LOCALITY | OL | OP | CP | SP | MA | SE | CA | TEXTURE | $H_2O$ |
|---|---|---|---|---|---|---|---|---|---|---|---|
| 76.244 MM 3 | Dunite | Mt-Albert | 85 | 10 | — | — | — | 5 | — | tecto. | 3.4 |
| L081-1 MM 1-17 | Dunite | Thetford | — | — | — | 2 | 8 | 90 | — | tecto. | 14.0 |
| VR80-7 | Harz. | Thetford | 30 | 20 | — | 2 | tr | 50 | tr | tecto. | 9.2 |
| RB80-2 MM 8-18 | Dunite | Thetford | tr | — | — | 10 | tr | 90 | tr | cumul. | 14.0 |
| LF81-5 | Dunite | Thetford | — | — | — | 10 | tr | 90 | — | cumul. | 12.6 |
| SH81-2 | Komatiite | Val d'Or | — | — | — | — | — | — | tr | Spini. | 4.6 |

OL = Olivine
OPX = Ortho-pyroxene
CPX = Clino-Pyroxene
SP = Spinel
MA = Magnetite
SE = Serpentine
CA = Carbonate
Spini. = Spinifex
Harz. = Harzburgite
tecto. = tectonic
cumul. = cumulite The first series of runs were qualitative in nature and were made to establish a positive identification of the gases produced using different types of ultramafic rocks (i.e., harzburgite, dunite and pyroxenites) from various stratigraphic levels and with different degrees of serpentinization. The reduction of heated copper oxide by evolved hydrogen and the aromatic odor of hydrocarbons were readily observed and the presence of these gases was subsequently confirmed by gas chromatography for selected samples.

Quantitative measurements of the gases produced during the deserpentinization process were achieved using a simple gas line from which the evolved gases were collected in a smoke stack bad and analyzed by gas chromatography. The starting materials were in the form of 100 g of powder heated for equal periods of time to a maximum temperature of approximately 700° C. The results are presented in Table 2.

TABLE 2

| SAMPLE | IDEN. | LOCAL. | $H_2O$ % | $H_2$ % | METH. PPM | ETH. PPM | PRO. PPM | BU. PPM | PEN. PPM | HE. PPM | BEN. PPM | TOL PPM |
|---|---|---|---|---|---|---|---|---|---|---|---|---|
| 76.244 | DUN. | ALBERT. | 3.4 | 0.3 | — | — | — | — | — | — | — | — |
| VR80-7 | HARZ | THETF. | 9.2 | 17.0 | 2500 | 40 | 90 | 60 | 570 | nd | 270 | nd |
| L081-1 | DUN. | THETF. | 14.0 | 12.5 | 670 | 150 | 150 | 60 | 70 | 3 | 5 | 2 |
| RB80-2 | DUN. | THETF. | 14.0 | 22.0 | 3180 | 90 | 120 | 50 | 30 | nd | nd | nd |
| LF81-5 | DUN. | THETF. | 12.6 | 7.0 | 2760 | 124 | 130 | 20 | 20 | nd | nd | nd |
| BH81-2 | SPIN | VAL D. | 4.6 | 9.0 | 2970 | 120 | 40 | nd | 20 | nd | nd | 4 |
| VR80-7 | HARZ Fe++/Fe° | THETF. | 9.2 | 80.0 | 1860 | 580 | 10 | 100 | 20 | 10 | nd | nd |

DUN. = Dunite
HARZ = Harzburgite
THETF. = Thetford Mines Ophiolite
VAL D. = Val D'Or
SPIN = Spinifex A-2 horizon Komatiite
METH. = Methane
ETH. = Ethane
PRO. = Propane
BU. = Butane
PEN. = Pentane
HE. = Hexane
BEN. = Benzene
TOL. = Toluene The analytical error is evaluated at 1 to 2% for hydrogen and 15% for the hydrocarbons. The volume of hydrogen is considered to be a minimum owing to substantial loss of gas at the numerous joints in the gas line and through diffusion prior to the analyses.

The total gas volume was measured by displacement of a water column saturated with sodium chloride and measured under the same temperature conditions. The total volume was estimated at 200 ml and consisted of 20% hydrogen, 10-15% carbon dioxide, =1% hydrocarbons, unknown gases and hot air compressed in the sample bag.

The results indicate that a substantial amount of hydrogen is produced if a minimum of structural water is available (i.e., approximately 9%) corresponding to approximately 50% serpentinization. Furthermore, a greater yield is achieved when the amount of magnetite is present only in trace amounts, i.e., when essentially all of the iron is in the ferrous state. The maximum production of hydrogen and hydrocarbons was found to occur at temperature in excess of 400° C. corresponding to the dehydroxylation of the serpentine minerals, brucite and to the dissociation of the carbonate minerals.

The hydrogen yield can be increased substantially if an adjuvant such as iron powder (electrolytic powder, $Fe^0$) is added and intimately mixed with the rock powder. By adding 10 g of iron to the reaction, the total gas production was substantially increased (to 4 liters) and was essentially pure hydrogen.

EXAMPLE 2

Figure 3:
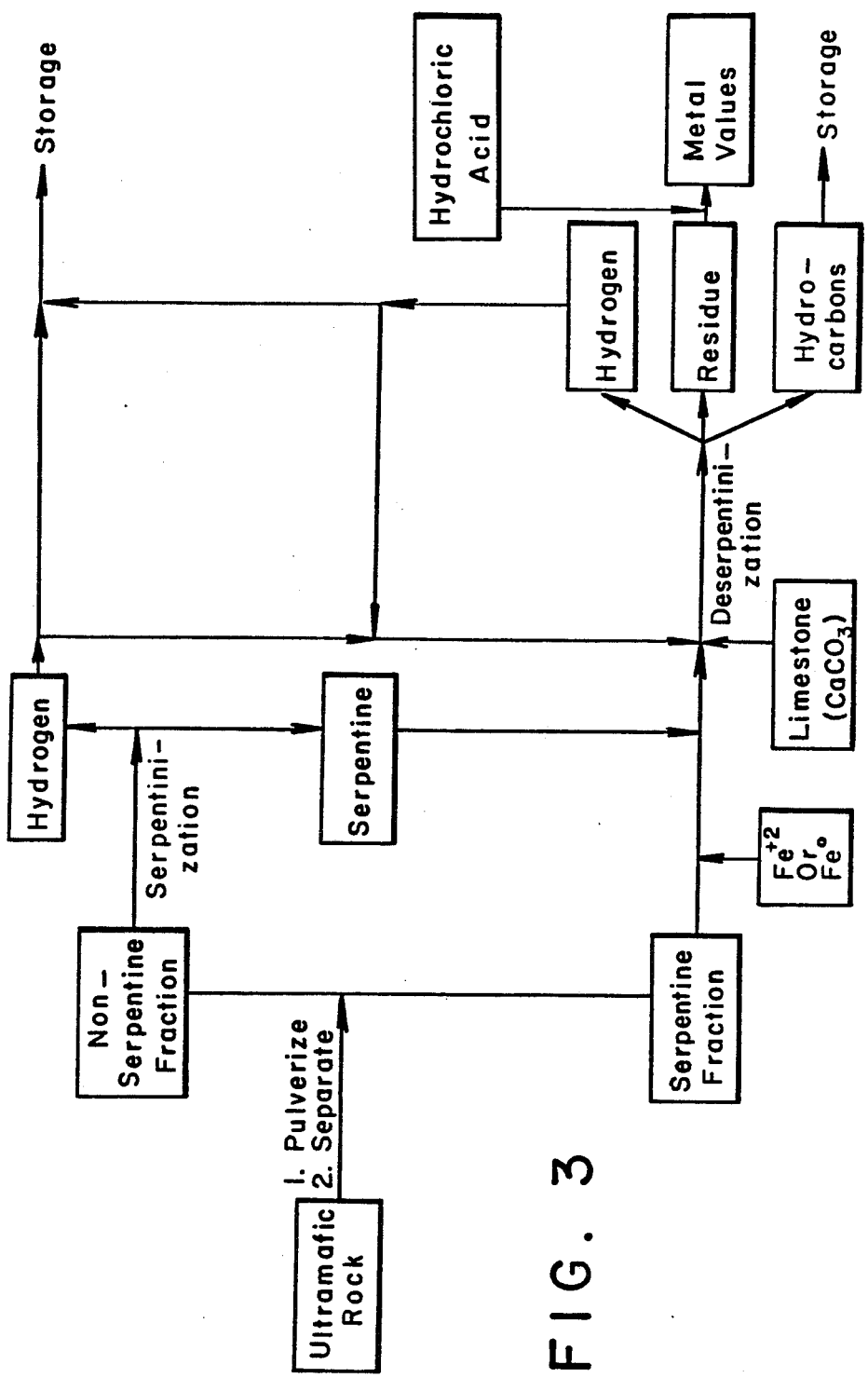
FIG. 3 is a schematic representation of the process and means for carrying out the invention according to a preferred embodiment.

Referring to FIG. 3, which depicts a preferred set-up for carrying out the invention in either a continuous or batchwise manner, an ultramafic rock, for example, asbestos tailings, is pulverized and/or sieved to a fine mesh size (e.g., −120 mesh or finer) and subjected to a separation procedure whereby the starting material is partitioned into non-serpentine and serpentine fractions. Suitable methods of separation include those based on differences between the non-serpentine and serpentine components of the material with respect to magnetic susceptibility (electromagnetic separation), dielectric constant (electrostatic separation) or density (flotation separation). The non-serpentine fraction normally will comprise such components as harzburgite, olivine and orthopyroxene; the serpentine fraction (less dense) can comprise components such as lizardite, brucite, chrysotile and magnetite.

The non-serpentine fraction is then reacted with water at a temperature of about 335° C. and pressure of about 0.5 bar under which conditions the material is serpentinized with evolution of hydrogen gas. The evolved hydrogen can, if desired, be used in part in a later step of the overall process as described hereafter, the balance being withdrawn and stored for future use, for example, as a fuel.

The serpentine residue from the serpentinization reaction is combined with the serpentine fraction of the partitioned ultramafic rock. The material is comminuted to impart to it a mesh size having a peak of between 200 and 230 mesh and another peak of between 270 and 325 mesh and then subjected to a deserpentinization reaction carried out by heating at a temperature of between about 300° C. and about 650° C. and at about atmospheric pressure (1 bar) for a period of time of between about 20 and about 45 minutes in the presence of added iron ($Fe^0$) powder and/or ferrous ($Fe+2$) ion (e.g., $FeSO_4$, FeS, or $FeCl_2$) which serves as a reductant to enhance the yields of hydrogen and hydrocarbons. The reductant has a mesh size with a peak of between 270 and 325 mesh and another peak of below 400 mesh. The aforesaid grain sizes of the serpentine materials and the reductant have been forced to optimize the efficiency of the reaction. The materials can be fed to the deserpentinization reaction either in the form of a slurry or preferably in the dry state. The products of the deserpentinization step are hydrogen, hydrocarbons and a solid residue. The hydrogen can be withdrawn to storage as was the hydrogen generated in the earlier-described serpentinization of the non-serpentine fraction of the ultramafic starting material. If desired, surplus hydrogen generated in either the serpentinization or deserpentinization reactions can be fed to the deserpentinization reaction along with limestone (a source of carbonate) which react together to form additional hydrocarbons and thereby enhance the yield. The hydrocarbons can be drawn off to an appropriate storage facility for subsequent use; for example, the hydrocarbon can furnish at least a portion of the fuel for supplying heat to the overall process, or can be used as a fuel generally, or as a petrochemical feedstock.

The solid residue from the deserpentinization reaction can be treated in any of the ways described hereinabove. For example, the solid residue from the deserpentinization reaction can be made to consist mainly of a transition crystal lattice having the chemical composition of the mineral olivine. Owing to the fact that this lattice is in a transition form which is metastable, it is much more readily attacked, for example, by HCl (e.g., 10 ml 8M HCl per gram of residue) than would be the case with normal olivine. This fact greatly increases the usefulness of this residue for the production of $MgCl_2$ by trituration with hydrochloride acid as shown in FIG. 3. The aqueous magnesium chloride can be used as a feedstock for magnesium metal production and for the winning of nickel and other valuable metals.

EXAMPLE 3

The procedure of Example 2 is repeated except that the added reductant (which enhances the yields of hydrogen and hydrocarbons) is in the form of powdered (minus 48 mesh, peak distribution minus 200 mesh) pig iron composed of about 90-95% by weight iron (of which approximatly 83% is Fe., 10% is FeO and 2% is $Fe_2O_3$), 1-2% carbon, 1-3% MgO-CaO, 1-5% silicates. The materials are fed to the deserpentinization in the dry state. Following deserpentinization, the solid residue is cooled to ambient temperature in a non-oxidizing, preferably reducing (e.g., $H_2$) atmosphere. The reductant is recovered magnetically (by virtue of the magnetic susceptability of the iron) and as recovered the iron content of the booster is found to have decreased in metallic iron content to 50%, indicating the preferential consumption of oxygen by the metallic content of the booster at the expense of the formation of MgO, NiO, $Fe_2O_3$, etc. This magnetic separation also removes magnetite ($Fe_3O_4$) and chromium spinel (Cr-Fe oxide) which were present in the serpentine feed. The prevention of unwanted formation of MgO, NiO, and $Fe_2O_3$ by use of the aforesaid booster coupled with the maintenance of a reducing atmosphere (i.e., hydrogen) in the deserpentinization step further enhances the susceptibility of the transition crystal lattice to attack by mineral acid, as evidenced by the vigrous ebullition with which the acid leaching proceeds. This results in a greater yield of extracted magnesium (e.g., $MgCl_2$ in the case of HCl leaching) and other metal cation values that were originally present in the feed.

The residue from the acid leaching step is in the colloidal state, is substantially free of iron oxide coloration and is composed mainly of amorphous silica (e.g., 95.4% weight percent $SiO_2$/4.6% metal oxide values). When dried and comminuted to sub-micron particle size (which is greatly facilitated by the absence of crystallinity) the silica can be further purified by acid leaching which is facilitated by the large surface area the amorphous silica particles. The silica thus purified is useful in a variety of applications for which ultra-pure silica has heretofore been used, e.g., foodstuffs, fillers, fiber optics and the like.

While the present invention has been described and illustrated hereinabove with reference to specific embodiments, those skilled in the art will recognize that modifications and variations may be made in the process without departing from the principles and spirit of the invention as set forth in the following claims.

I claim:

1. A process for forming hydrogen from comminuted ultramafic rock material comprising:
   (a) contacting comminuted ultramafic rock material containing a substantial unserpentinized fraction and less than about 9 percent by weight structural water, with water at a temperature and pressure for a period of time to cause serpentinization of the unserpentinized fraction and consequent formation of serpentine and production of hydrogen; and
   (b) subjecting the material treated in step (a) to a temperature and pressure for a period of time to cause deserpentinization and consequent formation of hydrogen and a solid residue.

2. A process according to claim 1 wherein:
   step (a) is conducted at
       a temperature of between about 300° and about 350° C., and
       a pressure of between about 0.3 and about 0.7 bar; and
   step (b) is conducted
       at a temperature of between about 200° and about 700° C., and
       at a pressure of about one bar.

3. A process according to claim 2 wherein step (b) is conducted at a temperature of between about 300° and about 650° C.

4. A process according to claim 1, 2 or 3 wherein metallic iron, ferrous ion, metallic zinc, wood charcoal, or petroleum coke is added in comminuted form to the material being deserpentinized in step (b) to enhance the production of hydrogen and hydrocarbons.

5. A process according to claim 4 wherein hydrogen produced in step (a) or step (b) is fed to the deserpentinization step (b) together with calcium carbonate to enhance the production of hydrocarbons.

6. A process according to claim 5 wherein a catalyst selected from the group consisting of metallic cobalt, chromium, nickel, zinc, copper and noble metals is added to the deserpentinization step to further enhance the production of hydrocarbons.

7. A process according to claim 2 or 3 wherein the solid residue from step (b) has a mineral content containing one or more of magnesium, iron, nickel, chromium, silicon or calcium values, said process further comprising the steps of:
   (c) subjecting the solid residue obtained in step (b) to a temperature of between about 700° and about 815° C. to impart a transition lattice structure to the mineral content of the residue; and
   (d) contacting the solid residue heated in step (c) with mineral acid to form an aqueous solution of mineral acid salts of said values.

8. A process according to claim 7 wherein step (d) is conducted with about 1 to 12M hydrochloric acid at ambient temperature.

9. A process according to claim 5 wherein:
   iron is added to the material being deserpentinized in step (b) in powdered form having a particle size of at least minus 48 mesh;
   step (b) is conducted at a temperature of between 600° and 700° C.;
   the solid residue obtained from step (b) is cooled to ambient temperature in a non-oxidizing atmosphere; and
   the iron is removed by magnetic separation.

10. A process according to claim 9 wherein the solid residue from step (b) has a mineral content containing one or more of magnesium, nickel, chromium, silicon or calcium values, said process further comprising the steps of:
    (c) subjecting the solid residue obtained in step (b) to a temperature of between about 700° and about 815° C. to impart a transition lattice structure to the mineral content of the residue; and
    (d) contacting the solid residue heated in step (c) with mineral acid to form an aqueous solution of mineral acid salts of said values.

11. A process for forming hydrogen from comminuted ultramafic rock material comprising subjecting comminuted ultramafic rock material containing a substantial serpentinized fraction and between about 9 percent and about 15 percent by weight structural water to a temperature and pressure for a period of time to cause deserpentinization and consequent formation of hydrogen and a solid residue.

12. A process according to claim 11 wherein:
    said temperature is between about 200° and about 700° C.; and
    said pressure is about one bar.

13. A process according to claim 12 wherein the ultramafic material is a float formed as a by-product of the manufacture of asbestos.

14. A process according to claim 12 wherein the temperature that the material is subjected to is between about 300° and about 650° C.

15. A process according to claim 11, 12, 13 or 14 wherein metallic iron, ferrous ion, metallic zinc, wood charcoal or petroleum coke is added in comminuted form to the material being deserpentinized to enhance the production of hydrogen and hydrocarbons.

16. A process according to claim 15 wherein hydrogen is fed to the deserpentinization reaction together with calcium carbonate to enhance the production of hydrocarbons.

17. A process according to claim 16 wherein a catalyst selected from the group consisting of metallic cobalt, chromium, nickel, zinc, copper and noble metals is added to the deserpentinization step to further enhance the production of hydrocarbons.

18. A process according to claim 11, 12, 13 or 14 wherein the solid residue has a mineral content containing one or more of magnesium, iron, magnetite, nickel, chromium, silicon or calcium values, said process comprising the further step of subjecting the obtained solid residue to a temperature of between about 700°, and about 815° C. to impart a transition lattice structure to the mineral content of the residue; and
    contacting the solid residue thus heated with mineral acid to form an aqueous solution of mineral acid salts of said values.

19. A process according to claim 18 wherein the solid residue is contacted with about 1 to 12M hydrochloric acid at ambient temperature.

20. A process according to claim 16 wherein:
    iron is added to the material being deserpentinized in step (b) in powdered form having a particle size of at least minus 48 mesh;
    step (b) is conducted at a temperature of between about 600° and 700° C.;
    the solid residue obtained from step (b) is cooled to ambient temperature in a non-oxidizing atmosphere; and
    the iron is removed by magnetic separation.

21. A process according to claim 20 wherein the solid residue from step (b) has a mineral content containing one or more of iron, magnetite, magnesium, nickel, chromium, silicon or calcium values, said process further comprising the steps of:
  (c) subjecting the solid residue obtained in step (b) to a temperature of between about 700° and about 815° C. to impart a transition lattice structure to the mineral content of the residue; and
  (d) contacting the solid residue heated in step (c) with mineral acid to form an aqueous solution of mineral acid salts of said values.

22. A process for forming hydrogen from clay containing structural water, comprising subjecting said material to a temperature and pressure for a period of time to cause dehydroxylation and consequent formation of hydrogen and a solid residue.

23. A process according to claim 22 wherein said temperature is between about 200° and about 700° C.;
  said pressure is about one bar; and
  said time period is between about 20 and about 45 minutes.

24. A process according to claim 23 wherein said temperature that the material is subjected to is between about 300° and about 650° C.

25. A process according to claim 22, 23, or 24 wherein metallic iron, ferrous ion, metallic zinc, wood charcoal or petroleum coke is added in comminuted form to the dehydroxylation to enhance the production of hydrogen.

26. A process according to claim 25 wherein at least a portion of the hydrogen produced is fed to the dehydroxylation reaction together with calcium carbonate to cause enhanced production of hydrocarbons.

27. A process according to claim 23 or 24 wherein the solid residue has a mineral content containing one or more of magnesium, nickel or calcium values, said process comprising the further steps of: subjecting the obtained solid residue to a temperature of between about 700° and about 815° C. to impart a transition lattice structure to the mineral content of the residue; and
  contacting the solid residue thus heated with mineral acid to form an aqueous solution of mineral acid salts of said values.

28. A process according to claim 27 wherein step (d) is conducted with about 1-12M hydrochloric acid at a temperature of between about 29° and about 35° C.

29. A process according to claim 26 wherein:
  iron is added to the material being dehydroxylated in powdered form having a particle size of at least minus 48 mesh;
  the solid residue obtained therefrom is cooled to ambient temperature in non-oxidizing atmosphere; and
  the iron is removed by magnetic separation.

30. A process according to claim 29 wherein the solid residue from step (b) has a mineral content containing one or more of magnesium, iron, magnetite, nickel, chromium, silicon or calcium values, said process further comprising the steps of:
  (c) subjecting the solid residue obtained in step (b) to a temperature of between about 700° and about 815° C. to impart a transition lattice structure to the mineral content of the residue; and
  (d) contacting the solid residue heated in step (c) with mineral acid to form an aqueous solution of mineral acid salts of said values.

* * * * *

UNITED STATES PATENT AND TRADEMARK OFFICE
CERTIFICATE OF CORRECTION

PATENT NO. : 4,798,717

DATED : January 17, 1989

INVENTOR(S) : Maurice Morency

It is certified that error appears in the above-identified patent and that said Letters Patent is hereby corrected as shown below:

```
Claim 11, column 12, line 14, "materialcomprising" should be--material
comprising--.
```

Signed and Sealed this

Fourth Day of May, 1993

Attest:

MICHAEL K. KIRK

*Attesting Officer*  *Acting Commissioner of Patents and Trademarks*